Dec. 19, 1967     D. T. AYERS, JR     3,358,794
DRUM BRAKE WITH AUTOMATIC ADJUSTER
Filed July 20, 1966     2 Sheets—Sheet 1
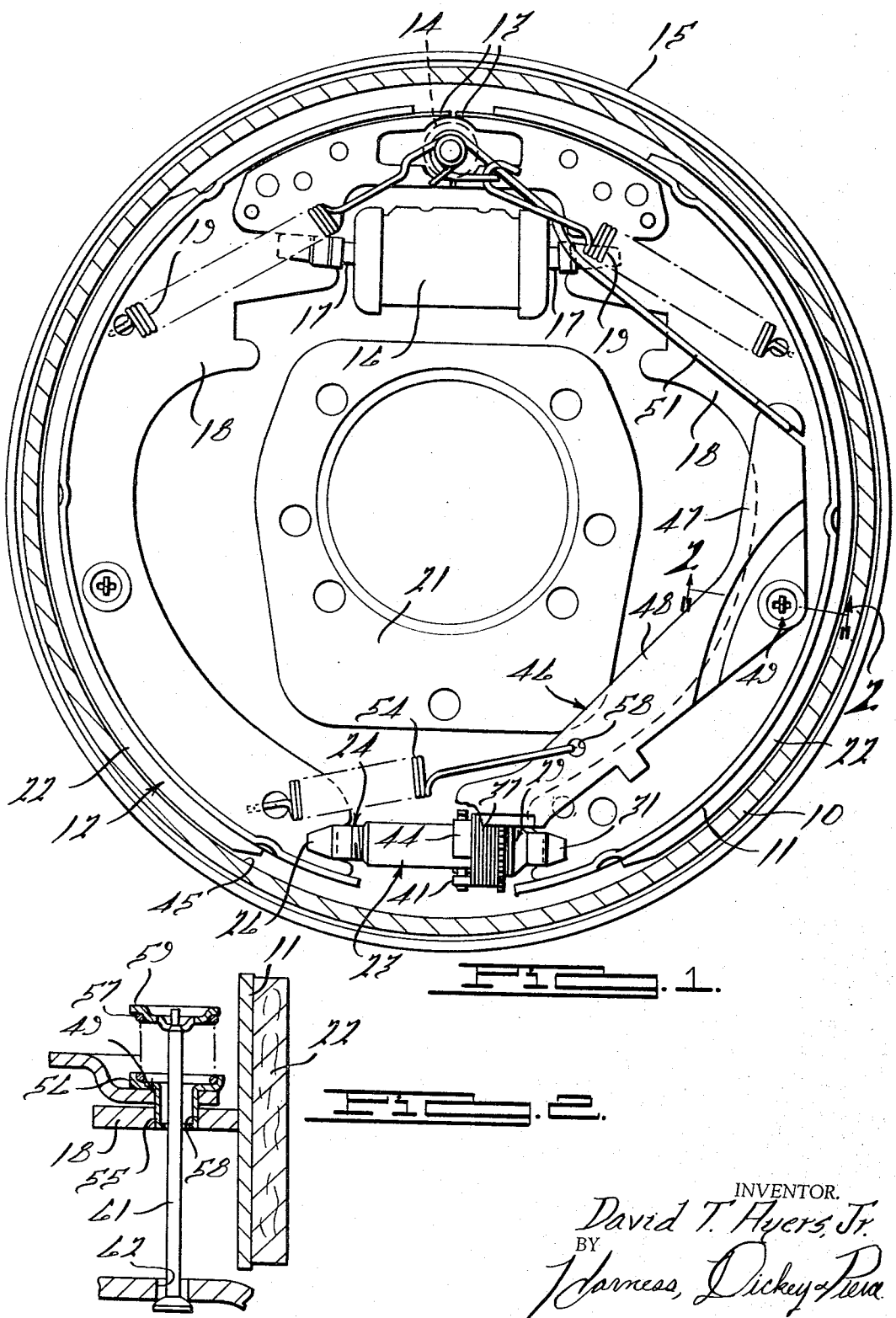
INVENTOR.
David T. Ayers, Jr.
BY Harness, Dickey & Pierce
ATTORNEYS Dec. 19, 1967   D. T. AYERS, JR   3,358,794
DRUM BRAKE WITH AUTOMATIC ADJUSTER
Filed July 20, 1966   2 Sheets-Sheet 2
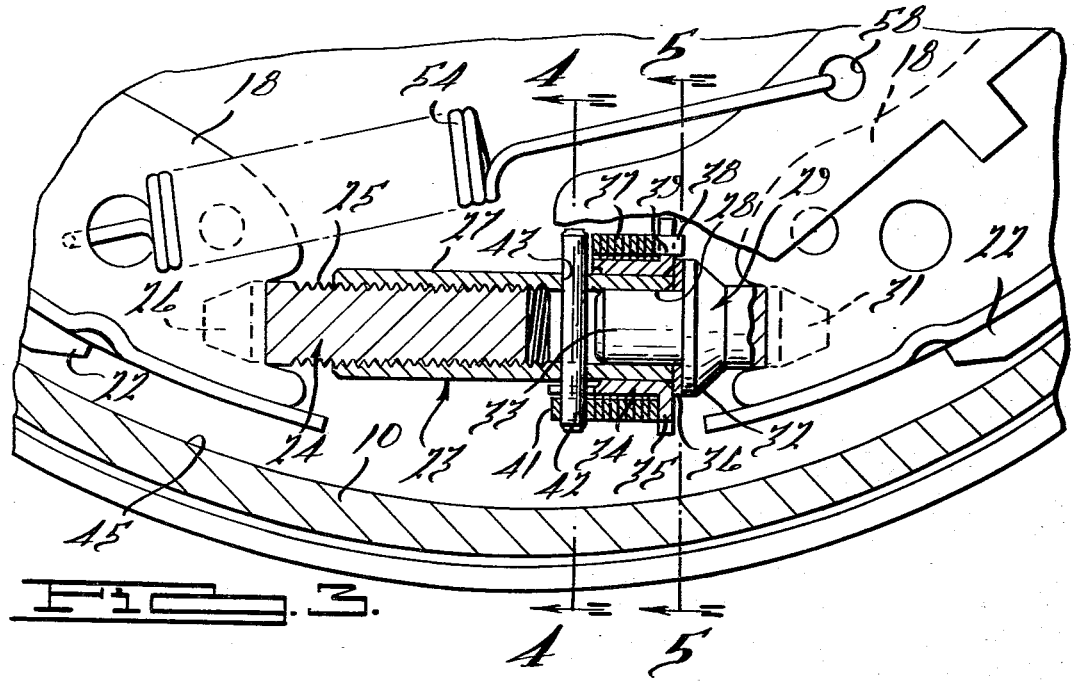
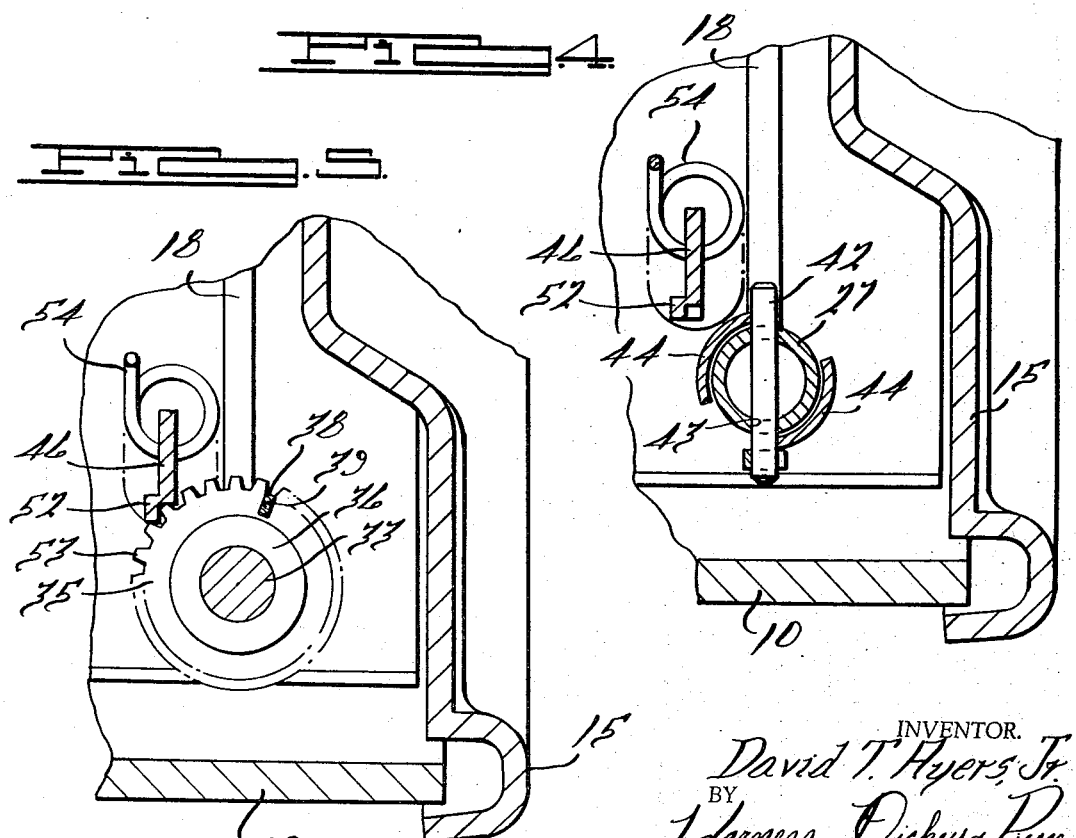
INVENTOR.
David T. Ayers, Jr.
BY
Harness, Dickey & Pierce
ATTORNEYS United States Patent Office 3,358,794
Patented Dec. 19, 1967

3,358,794
DRUM BRAKE WITH AUTOMATIC ADJUSTER
David T. Ayers, Jr., Birmingham, Mich., assignor to Kelsey-Hayes Company, a corporation of Delaware
Filed July 20, 1966, Ser. No. 566,548
5 Claims. (Cl. 188—79.5)

ABSTRACT OF THE DISCLOSURE

This invention relates to automatic adjusting devices for the shoes of drum brakes, and particularly to an automatic device for adjusting the brake shoes relative to the drum while limiting the amount of pressure which can be applied to said adjustment. The amount of pressure is limited by a coil spring connection between the adjusting lever and the adjusting screw.

---

At the ends of the two brake shoe sections opposite those engaged by the fluid actuated cylinder, there is a pair of studs containing slotted ends which receive the adjacent webs of the two shoes. The end of one stud opposite to that containing the slot has a thread. The end of the other stud opposite to that containing the slot has a stub shaft. A sleeve has an internal thread on one end which mates with the thread of the stud and a smooth cylindrical bore on the other end which receives the stub shaft of the other stud. A sleeve is provided over the internally threaded sleeve adjacent to the stud having the stub shaft with an outwardly extending flange containing serrated teeth. A flat coiled spring has one end secured in a slot in the flange having the teeth, the opposite end is of U-shape to extend over the end of a pin which projects through the sleeve between the pair of studs. The end of the sleeve opposite to that having the serrated teeth has the body slotted to receive the pin to permit the spring to be wound a predetermined amount. This permits a predetermined force to be applied through the spring for turning the sleeve and changing the distance between the slotted ends of the studs. A pivoted arm is carried by one of the brake shoes having an end which engages the serrated teeth when moved upwardly and downwardly by the braking operation of the vehicle. Upon backing the vehicle and applying the brake, the arm will be moved downwardly to turn the flange to thereby tighten the spring and attempt to rotate the sleeve having the internal thread. If this can be done without too much force, the sleeve will turn and thereby spread apart the ends of the studs having the slots therein. If too much pressure is required to turn the sleeve, the spring will tighten but the internally threaded sleeve will not be rotated. Such rotation will occur when sufficient wear is present between the brake shoes and drum to reduce the force required to turn the sleeve through the spring. In this manner slack is taken up between the adjacent ends of the brake shoes so that the brake shoes will set up at all times to a desired position relative to the surface of the brake drum.

Accordingly, the main objects of the invention are: to provide automatic adjusting means for taking up the slack between the adjacent ends of a pair of brake shoes as wear occurs between the shoes and the face of the drum; to take up the slack between adjacent ends of the brake shoes by rotating a sleeve on a pair of studs which increase the length thereof when the sleeve is turned when a rotating force is applied through a flat coil spring; to separate the ends of a pair of studs for taking up slack in a pair of brake shoes by securing a part of a sleeve to one end of a spring and fixing the other end to a star wheel which is rotated when the brakes are applied through the spring in a predetermined sequence, and in general to provide means for taking up the slack between the brake shoes and the associated drum which is simple in construction, positive in operation and economical of manufacture.

Other objects and features of novelty of the invention will be specifically pointed out or will become apparent when referring, for a better understanding, to the following description taken in conjunction with the accompanying drawings, wherein:

FIGURE 1 is a sectional view of a brake drum assembly embodying features of the present invention;

FIG. 2 is an enlarged broken sectional view of the structure illustrated in FIG. 1, taken on the line 2—2 thereof;

FIG. 3 is an enlarged broken sectional view of the structure illustrated in FIG. 1, showing the lower part thereof;

FIG. 4 is a broken sectional view of the structure illustrated in FIG. 3, taken on the line 4—4 thereof, and FIG. 5 is an enlarged broken sectional view of the structure illustrated in FIG. 3, taken on the line 5—5 thereof.

Brake drums 10 are mounted in fixed relation to the wheels of an automotive vehicle in a manner to rotate therewith. A pair of brake shoes 11 and 12 are supported within the drums to have its arcuate recessed ends 13 disposed about a pin 14 secured to the backing plate 15. A fluid operated cylinder 16 is secured to the backing plate and is provided with a pair of piston rods 17 which engage the web 18 of the brake shoes 11 and 12 for spreading the shoes apart when applying a braking pressure to the drum. Springs 19 retain the web 18 against the pistons 17 for retracting the shoes when the pressure is released from the pistons on the rods 17 within the cylinder 16. A supporting plate mounted on a flange on the rear axle housing mates with a face 21 at the center of the backing plate 15 which also mates with the plate on the spindle on the front wheel assembly. The brake shoes have conventional brake lining material 22 riveted, adhered or otherwise secured thereto.

The present invention pertains to means for adjusting the brake shoes relative to the face of the drum 10 to be engaged thereby. The opposite ends of the shoes to those abutting the pin 14 are adjustable away from each other by an adjustment assembly 23. This assembly embodies a stud 24 having an exterior thread 25 and a slotted end 26. An internally threaded sleeve 27 is threaded onto the thread 25 of the stud 24. The internal surface 28 at the opposite end is cylindrical and smooth. A stud 29 has a slotted end 31, a flange 32 and a cylindrical stub shaft 33 which mates with the surface 28 when extending within the opposite end of the sleeve 27 from that having the internal thread.

A sleeve 34 flanged outwardly on one end is provided with teeth to form a star wheel 35. The sleeve 34 is mounted on the sleeve 27 against a washer 36 which abuts the flange 32 on the stud 29. A flat coil spring 37 is mounted on the sleeve 35 having one end disposed normal to the coils to extend through a slot 39 in the star wheel 35. The opposite end 41 of the spring is formed into U-shape and hooked over one end of a spring pin 42 which expands in apertures 43 through the sleeve 27 to frictionally engage the walls thereof. The sleeve 34 at the area of the pin has diametrical portions of the wall cut away to have the remaining portion 44 diametrically disposed and located on opposite sides of the pin as illustrated in FIG. 4. The extending portions 44 permit the spring to be wound to a predetermined tension so that in normal operation additional tension applied thereto will cause the sleeve 27 to rotate on the threads 25. This moves the two studs 24 and 29 apart and moves the adjacent ends of the web 18 of the shoes 11 and 12 therewith to take up any slack in the shoes so as to maintain the brake linings 22 in a desired position relative to the braking face 45 of the brake drum 10.

A link 46 has an upwardly extending arm 47, and a downwardly extending arm 48 from a pivot 49. The upper end of the arm 47 is connected by a wire link 51 to the pin 14. The arm 48 has an offset end 52 which engages a tooth 53 of the star wheel 35, as illustrated in FIG. 5. A coil spring 54 connects the brake shoe 12 with the arm 48 to maintain the web 18 in the bottom of the slots 26 and 31 of the studs 24 and 29. The spring 54 also provides a bias for raising the finger 52 to assist in moving it out of engagement with a tooth 53. As illustrated in FIG. 2, the pivot 49 embodies a sleeve 55 having an expanded end 56 which receives a coil spring 57 for urging the sleeve downwardly into an aperture 58 in the web 18. A cap 59 is retained against the top of the spring 57 by a pin 61 which extends through an aperture 62 in the back plate 15.

When the vehicle is moving rearwardly and the brakes are applied, the shoes will be carried clockwise and because of the holding of the arm portion 47, the end portion 48 will move downwardly as illustrated in FIG. 5, and turning the star wheel to wind up the spring 37 which will attempt to rotate the sleeve 27 to separate the studs 24 and 29. This rotation will occur if there is no resistance to the turning of the sleeve 27. However, if the brakes are tight and do not need adjusting, the force required to turn the sleeve 27 will be greater than that built up in the spring 37 which will wind a predetermined amount but will not rotate the sleeve 27. With this arrangement, a takeup will occur to the brake shoes when wear occurring between the brake linings and the surface of the drum and assurance is had that like braking will occur at all times.

What is claimed is:

1. In a device for adjusting brake shoes within a brake drum, an expanding device having end members engaging a web of a pair of shoes at the end opposite to that to which the brake pressure is applied, a rotatable member for expanding said device by moving said end members apart, a rotatable sleeve on said rotatable member having a toothed star wheel thereon, a spring having one end secured to said star wheel and the opposite end connected to said rotatable member, and means for advancing said star wheel to apply a force to said rotatable member through said spring.

2. In a device for adjusting brake shoes as recited in claim 1, wherein said advancing means embodies an arm carried by the web of one of the brake shoes for movement to and from the teeth of the star wheel produced by a braking sequence for winding the spring and attempts to turn the threaded sleeve through said spring.

3. In a device for adjusting brake shoes as recited in claim 1, wherein means are provided for limiting the unwinding of the spring so that an initial force may be provided therein.

4. In a device for adjusting brake shoes as recited in claim 1, wherein the star wheel has a sleeve portion thereon which is slotted for receiving a pin which applies the turning force to the threaded sleeve which permits a predetermined windup to the spring for adjusting the load applied thereto.

5. In a device for adjusting brake shoes as recited in claim 1, wherein a star wheel is mounted on a sleeve and the spring is of the flat helical type disposed over the star wheel sleeve having one end anchored to the star wheel, a pin extending through the threaded sleeve between the studs and extensions on the star wheel sleeve to which the opposite end of the spring is secured, the pin extending between the wall portions to permit a predetermined force to be wound in the spring, and an arm carried by one of the shoes having an end engaging the teeth of the star wheel which is moved by a sequence of brake operations for turning the threaded sleeve for increasing the tension on the spring which will attempt to rotate the threaded sleeve.

References Cited
UNITED STATES PATENTS 3,010,544  11/1961  Dahle et al. _____ 188—79.5
3,131,787  5/1964  Swift _____ 188—79.5

DUANE A. REGER, *Primary Examiner.*